April 10, 1956  E. A. WAGNER  2,741,378
ONE-ARM WORK HANDLING VEHICLE
Filed March 21, 1952  2 Sheets-Sheet 2
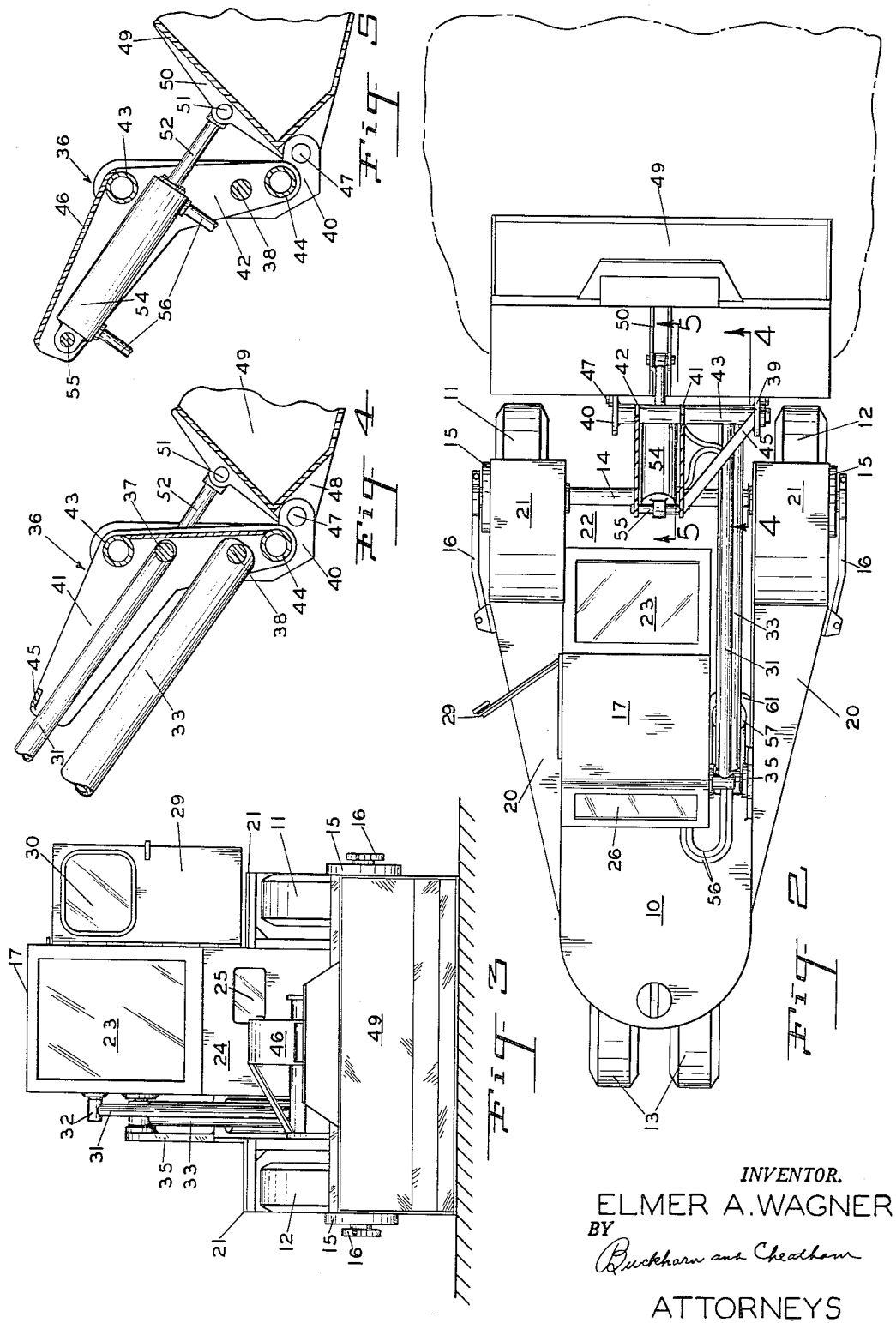
INVENTOR.
ELMER A. WAGNER
BY
Buckhorn and Cheatham
ATTORNEYS United States Patent Office 2,741,378
Patented Apr. 10, 1956

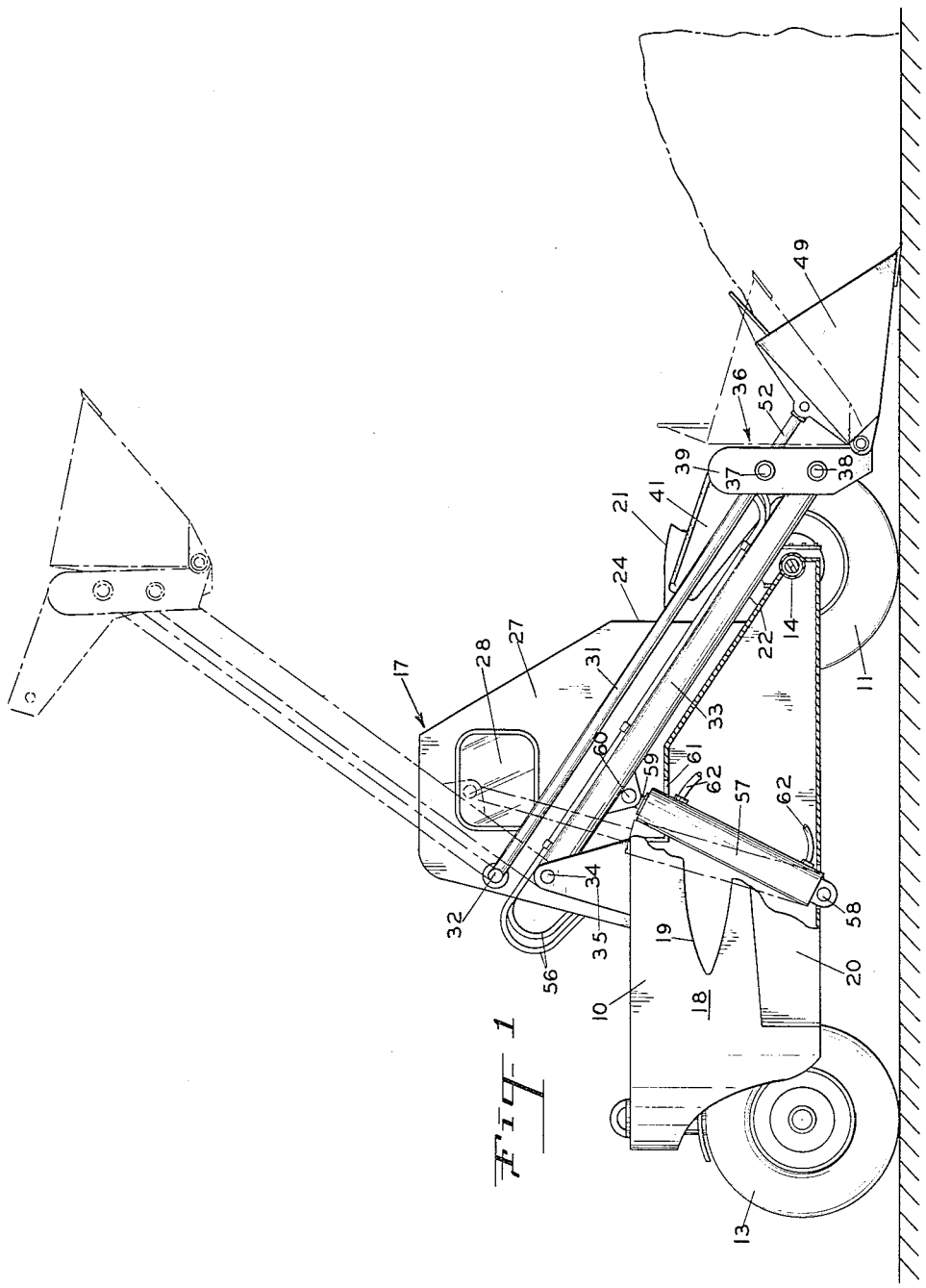

2,741,378

ONE-ARM WORK HANDLING VEHICLE

Elmer A. Wagner, Portland, Oreg.

Application March 21, 1952, Serial No. 277,764

1 Claim. (Cl. 214—140)

The present invention relates to an automotive vehicle of the work handling type, the vehicle being of the type including a boom mechanism supporting a frame at its free end upon which may be mounted a work handling device. I have herein illustrated the work handling device as comprising a material handling scoop, but it is to be appreciated that other devices such as lift forks, platforms, buckets, hayforks and the like may be substituted for the scoop.

The principal object of the present invention is to provide a machine of the class described with safety features not found in such vehicles at present on the market. One of the safety features is the provision of means for preventing bodily contact of the operator with the boom or other operating mechanism of the work handling device, and another safety feature is the provision of means affording clear vision of the operator between the front wheels of the vehicle so that he may not only see the ground beneath the work handling device but may clearly see the work handling device when it is in operation adjacent the ground level.

Another object of the present invention is the provision of a machine of the foregoing character by means of a fewer number of parts than heretofore employed.

The foregoing objects and advantages will be more readily apparent from inspection of the accompanying drawings taken in connection with the following specification wherein like numerals refer to like parts throughout.

In the drawings,

Fig. 1 is a view in side elevation of the vehicle of the present invention, with parts broken away, illustrating the boom and work handling device in full line at the ground-engaging position of the work handling device, and in skeleton outline at other positions thereof;

Fig. 2 is a plan view of the vehicle with parts broken away;

Fig. 3 is a front elevation of the vehicle;

Fig. 4 is a partial vertical section on an enlarged scale taken substantially along line 4—4 of Fig. 2; and Fig. 5 is a partial vertical section on an enlarged scale taken substantially along line 5—5 of Fig. 2.

The vehicle herein illustrated is exemplary, the same comprising a tricycle vehicle of the type including a chassis 10 supported by a pair of forwardly positioned driving wheels 11 and 12 and a rear tiller wheel construction, in this instance including a pair of wheels 13. The forward driving wheels 11 and 12 are mounted at the front corners of the chassis with their forward extremities extending beyond the chassis, the wheels being at the opposite ends of an axle construction indicated at 14 and which defines the front end of the chassis. It is to be appreciated that an engine is mounted within the chassis, the same not being shown since such devices are conventional and form no part of the present invention, the engine being operatively associated with the driving wheels through the axle construction 14 by means such as shown in Patent No. 2,503,181, issued April 4, 1950. Each of the wheels preferably comprises a free wheeling assembly indicated at 15 which may be locked by an arm 16 for the purpose of rendering the driving wheels effective, as illustrated, described and claimed in Patent No. 2,557,485, issued June 19, 1951. Mounted upon the chassis there is provided a laterally offset operator's cab 17 within which are provided the usual controls (not shown) including a steering wheel operatively connected with the tiller wheels 13 by suitable means such as illustrated and described in Patent No. 2,502,357, issued March 28, 1950. The chassis 10 preferably comprises a structure formed of heavy plates welded together and including vertical side walls 18 in which may be provided openings 19 for permitting access to the engine. On each of the side walls 18 there are preferably provided laterally extending housing structures 20, the upper surfaces of which provide ramps or platforms upon which the operator may stand when servicing the vehicle, or entering or leaving the cab 17, and the forward ends of which preferably are formed to provide fenders 21 for the driving wheels 11 and 12.

In accordance with the present invention, the chassis terminates in the longitudinal direction at its front edge in alignment with the axle construction 14. The upper surface of the chassis immediately to the rear of the axle construction 14 is of limited height, the same being afforded by a rearwardly sloping upper wall 22. The forward wall of the cab 17 comprises an upper sloping portion consisting principally of a large window 23, adjacent the lower edge of which there is provided a vertical wall portion 24 extending downward to join the sloping wall 22. The vertical wall is adjacent the rear extremities of the wheels 11 and 12 and a portion of the vertical wall 24 comprises a window 25 positioned to one side of the longitudinal centerline of the cab and at such height that an operator seated in the cab may look through the window 25 across the upper surface of the sloping wall 22 beyond the axle construction 14 to the ground between the wheels 11 and 12 closely adjacent to the forward extremities thereof. Preferably the cab comprises a large rear window 26 affording rear view beyond the tiller wheels 13. The right or inner wall 27 of the cab is preferably a vertical wall having a window 28 therein, the wall being a complete wall without openings therethrough. The sole access to the cab is provided by means of a door 29 in the left wall of the cab, the door preferably having a window 30 therein. The operator may therefore have clear vision entirely around the cab, particularly in the forward direction. It is to be noted that the wall 27 is offset inwardly from the right wall 18. A portion of the right wall 18 extends forwardly inside of the structure 20 and the fender 21 in parallel, spaced relation to the wall 27, an extension of the upper wall 22 extending upwardly between the two walls 18 and 27. There is therefore provided a forwardly sloping, relatively large slot closely adjacent the right wall of the operator's cab.

A single boom is mounted upon the cab, the boom comprising a parallelogram construction afforded by an upper elongated member 31 pivoted on the wall 28 adjacent the rear edge thereof at an elevated point as indicated at 32, and a heavier, lower elongated member 33 pivoted at a point beneath the pivot point 32 indicated at 34, the member being pivotally supported between the wall 27 and a standard 35 mounted on and rising above the side wall 18 of the chassis. A frame 36 is mounted at the free end of the boom, the free end of the member 31 being attached thereto by a pivot 37 and a free end of the member 33 being attached thereto by a pivot 38. The boom swings in a vertical plane closely adjacent to and parallel to the wall 27 of the cab, and by virtue of the parallelogram construction of the boom the frame 36 always remains in an upright condition. The frame includes parallel side plates 39 and 40 and parallel, intermediate vertical plates 41 and 42, the pivot 37 extending between the plates 39 and 41 and the pivot 38 extending between the plates 39 and 40. The plates are all welded to upper and lower bracing pipes 43 and 44 which extend from side to side of the frame. The plates 41 and 42 have rearwardly extending upper portions which overlie the axle construction 14 at their rear ends when the boom is lowered, and a diagonal brace 45 extends between the upper extremity of the plate 39 and the upper rear extremity of the plate 41. A cap plate 46 is welded between the upper edges of the rearward extensions of the plates 41 and 42 further to provide a rigid structure and to protect a cylinder mechanism mounted upon the frame. The frame extends laterally across a portion only of the front of the chassis between the forward extremities of the wheels, the frame extending from adjacent the wheel 12 to a position beyond the longitudinal centerline of the cab. There is thus provided a clear space in front of the window 25.

Each of the plates 39 and 40 is provided with a forwardly extending ear at its lower end in which is engaged a pivot 47 suitably mounted upon brackets 48 at the lower rear edge of the material handling device such as the scoop 49 herein illustrated. The material handling device extends across the entire front of the vehicle and the lower rear edge thereof may be clearly seen through the window 25 when the boom is lowered. The material handling device comprises a rear wall including an upright bracket 50 supporting a pivot 51 which is pivotally engaged with the forward extremity of a piston rod 52. The piston rod 52 extends forwardly from a cylinder 54 mounted in the frame between the plates 41 and 42, its rear end being pivotally supported upon a pivot 55 mounted between the upper rear extremities of the plates. The piston and cylinder comprise reversible mechanism for advancing and retracting the pivot 51, thereby forcing the work handling device to swing about its pivots 47. Motive fluid is supplied to the cylinder 54 through tubes such as indicated at 56, under control of the operator through suitable means in the cab (not shown).

The boom may be raised and lowered by means of reversible extension means comprising a cylinder 57 extending upwardly inside of the chassis, the cylinder being mounted at its lower end on a pivot 58 suitably mounted at the bottom of the chassis. A piston 59 is operatively mounted in the cylinder 57 and is pivotally connected to a pivot 60 mounted upon the lower surface of the boom member 33. The upper end of the cylinder 57 extends through an opening 61 in the upper wall 22 so that the piston may swing. Motive fluid for the piston is supplied through tubes 62 and suitable means under control of the operator in the cab (not shown).

An advantage of the present construction is illustrated in Fig. 1 where it is seen that the independent motive means for pivoting the scoop 50 permits the operator to drive the vehicle forwardly into a pile of material to the point indicated in full line in Fig. 1. Thereupon the piston 52 may be retracted to raise the scoop to the position shown in skeleton outline at a lower level in Fig. 1. This permits the operator to obtain a full scoop load prior to commencing the elevation of the boom. If it were necessary to raise the boom with the scoop in its lowered position, most of the material would run out of the scoop. Independent control of the piston 52 permits the operator to dump the material at any point in the arc of movement of the boom. The construction of the windows 23 and 25 permits the operator to see the material handling device at any position, thus preventing accidents to other personnel.

The operator is safeguarded by reason of having a complete barrier wall between the swinging boom and himself. There are no openings through which his elbow or hand may project and the sole access to the cab is through the wall opposite the wall adjacent which the boom moves. A further degree of safety to others than the operator is afforded by reason of having the boom close to the longitudinal axis of the vehicle, hence it is extremely unlikely that anyone would be injured by movement of the boom.

Having illustrated and described a preferred embodiment of the present invention, it should be apparent to those skilled in the art that the same permits of modification in arrangement and detail. I claim as my invention all such modifications as come within the true spirit and scope of the appended claim.

I claim:

A machine of the class described comprising a wheeled vehicle including a chassis, a plurality of ground-engaging wheels supporting said chassis and including a laterally spaced pair of forward wheels at the respective forward corners of said chassis, said chassis being low to the ground and open between the forward halves of said forward wheels, an operator's cab rising above said chassis, said cab being substantially narrower than said chassis, offset laterally toward one side of said chassis, extending rearwardly from a point between the rearward halves of said forward wheels to an intermediate part of said chassis so as to be mostly forward of the longitudinal midpoint of the vehicle, and having an imperforate, vertical inner wall extending longitudinally of the vehicle between the longitudinal axis of the vehicle and one of said forward wheels, a work-handling device arranged symmetrically with respect to the longitudinal axis of the wheels and capable of ground engagement immediately adjacent said forward wheels, horizontal, transverse pivot means mounted on said chassis at an elevated point adjacent the rear edge of said inner wall and near the top of the cab, a single boom mounted on said pivot means, said boom extending forwardly between said inner wall and said one forward wheel and carrying said work-handling device at its free end, and boom operating means mounted on said chassis and operatively connected to said boom for swinging said boom in a vertical plane, and said cab comprising a front wall having window means therein affording an operator seated within said cab clear view of the ground between the forward portions of said front wheels.

References Cited in the file of this patent

UNITED STATES PATENTS

| | | |
|---|---|---|
| 1,362,566 | Fulton et al. | Dec. 14, 1920 |
| 2,211,194 | Baker | Aug. 13, 1940 |
| 2,398,585 | Hayward | Apr. 16, 1946 |
| 2,451,101 | Leschinsky | Oct. 12, 1948 |
| 2,503,181 | Wagner | Apr. 4, 1950 |
| 2,619,244 | Smith | Nov. 25, 1952 |
| 2,638,235 | Pokorny | May 12, 1953 |